US011309659B2

(12) United States Patent
Doi

(10) Patent No.: US 11,309,659 B2
(45) Date of Patent: Apr. 19, 2022

(54) DRIP-PROOF STRUCTURE, CONNECTOR WITH DRIP-PROOF STRUCTURE AND ELECTRIC CONNECTION BOX

(71) Applicant: Yazaki Corporation, Tokyo (JP)

(72) Inventor: Teppei Doi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/169,791

(22) Filed: Feb. 8, 2021

(65) Prior Publication Data

US 2021/0288435 A1 Sep. 16, 2021

(30) Foreign Application Priority Data

Mar. 12, 2020 (JP) .............................. JP2020-042713

(51) Int. Cl.
*H01R 13/52* (2006.01)

(52) U.S. Cl.
CPC ..... *H01R 13/5227* (2013.01); *H01R 13/5213* (2013.01)

(58) Field of Classification Search
CPC ............ H01R 13/5227; H01R 13/5213; B60R 16/0239
See application file for complete search history.

(56) References Cited

U.S. PATENT DOCUMENTS

| 9,972,935 B2* | 5/2018 | Oda ................... H01R 13/5227 |
| 2016/0156162 A1* | 6/2016 | Yamaguchi .............. H05K 7/02 361/624 |
| 2018/0013230 A1 | 1/2018 | Oda et al. |
| 2019/0013657 A1* | 1/2019 | Doi .......................... H02G 5/08 |

FOREIGN PATENT DOCUMENTS

| JP | 2018-007481 A | 1/2018 |
| JP | 6318085 B2 | 4/2018 |
| KR | 20120072704 A * | 7/2012 ......... B60R 16/0239 |

* cited by examiner

*Primary Examiner* — Tho D Ta
(74) *Attorney, Agent, or Firm* — Sughrue Mion, PLLC

(57) ABSTRACT

A drip-proof structure includes an upper wall of a connector body and an inclined face, the connector body being configured to be mounted to protrude in a canopy-like fashion from a panel-like object extending in a vertical direction and to extend in a traverse direction for a length equal to or greater than a width of a component mount area located below to block liquid from falling onto the component mount area, the inclined face being provided on an upper face of the upper wall and extending from a tip portion side to the panel-like object side of the connector body, the inclined face being inclined downward, with respect to the traverse direction, from a top position toward a side edge of the upper face to a terminal position positioned with a gap from the side edge to guide liquid received by the upper wall to the terminal position.

8 Claims, 4 Drawing Sheets

DRIP-PROOF STRUCTURE, CONNECTOR WITH DRIP-PROOF STRUCTURE AND ELECTRIC CONNECTION BOX

TECHNICAL FIELD

The present invention relates to a drip-proof structure configured to be provided for example to an electric connection box and such to prevent liquid from falling onto a component mount area, to a connector with drip-proof structure having such drip-proof structure and to an electric connection box.

BACKGROUND

Conventionally, some electric connection boxes configured to be mounted on a vehicle and such are provided with a connector for electrically connecting with other devices. Many of such electric connection boxes are arranged such that a tip portion side of a connector is exposed from an opening of a housing. In this case, if the electric connection box is subjected to liquid such as water for some reason during traveling of a vehicle, then the liquid enters inside the housing from said opening and such and falls onto a component mount area thereinside, possibly causing short circuit of a semiconductor component or the like that is weak to liquid.

In view of this, there is proposed a technique for blocking liquid from falling onto the component mount area using the connector that is in many cases arranged above the component mount area in the electric connection box as described above (for example, refer to Patent Document 1 and Patent Document 2). In the techniques described in these patent documents, the entered liquid is received by an upper wall of a connector, and an inclined face provided to an upper face of this upper wall guides the liquid to a side edge of the connector where a risk of the liquid falling onto the component mount area is small, and then the liquid is discharged downward at this position.

PRIOR ART DOCUMENT

Patent Documents

Patent Document 1: JP 6318085 B
Patent Document 2: JP 2018-007481 A

SUMMARY OF THE INVENTION

Problem to be Solved by the Invention

In the techniques described in the above-mentioned patent documents, however, the liquid received by the upper wall of the connector may retain thereon and is not guided smoothly, possibly causing the liquid to fall out downward at the intermediate position where there is a risk that the liquid falls onto the component mount area.

In view of the above-described problem, an object of the present invention is to provide a drip-proof structure which can smoothly guide the liquid received, a connector with drip-proof structure having such drip-proof structure and an electric connection box.

Solution to Problem

In order to achieve the above-described object, the present invention provides, in one aspect, a drip-proof structure comprising an upper wall of a connector mounted so as to protrude in a canopy-like fashion from a mount position close to an upper end of a panel-like object extending in a vertical direction and so as to extend, in a traverse direction arranged along the panel-like object and intersecting the vertical direction, for a length equal to or greater than a traverse width of a component mount area located below the mount position, the connector being configured to block liquid from falling onto the component mount area; and an inclined face provided on an upper face of the upper wall so as to extend from a tip portion side in a protruding direction of the connector to the panel-like object side of the connector. With respect to the traverse direction, the inclined face is inclined downward from an arbitral top position toward at least one of side edges at both ends of the upper face and to a terminal position positioned with a gap from the side edge, and the inclined face is configured to guide the liquid received by the upper wall to the terminal position.

Advantageous Effect of the Invention

According to the drip-proof structure described above, the terminal position of the inclined face on the upper face of the upper wall of the connector is positioned distant from the side edge of the upper face to the top position side. By positioning the terminal position of the inclined face in this manner, the inclination of the inclined face is steep as compared with the case where, for example, the terminal position of the inclined face is set on the side edge. This steep inclined face enables to smoothly guide the liquid received by the upper wall to the terminal position.

According to a connector with the drip-proof structure described above, the drip-proof structure described above is constituted so as to include the upper wall of the connector body, thus the liquid received by the upper wall can be guided smoothly.

Further, according to an electric connection box of the present invention, the drip-proof structure described above is constituted so as to include the upper wall of the connector body of the electric connection box, thus the liquid entering inside the housing and received by the upper wall of the connector body can be guided smoothly.

DETAILED DESCRIPTION OF THE EXEMPLARY EMBODIMENTS

In the following, embodiments of a drip-proof structure, a connector with drip-proof structure and an electric connection box are explained.

Figure 1:
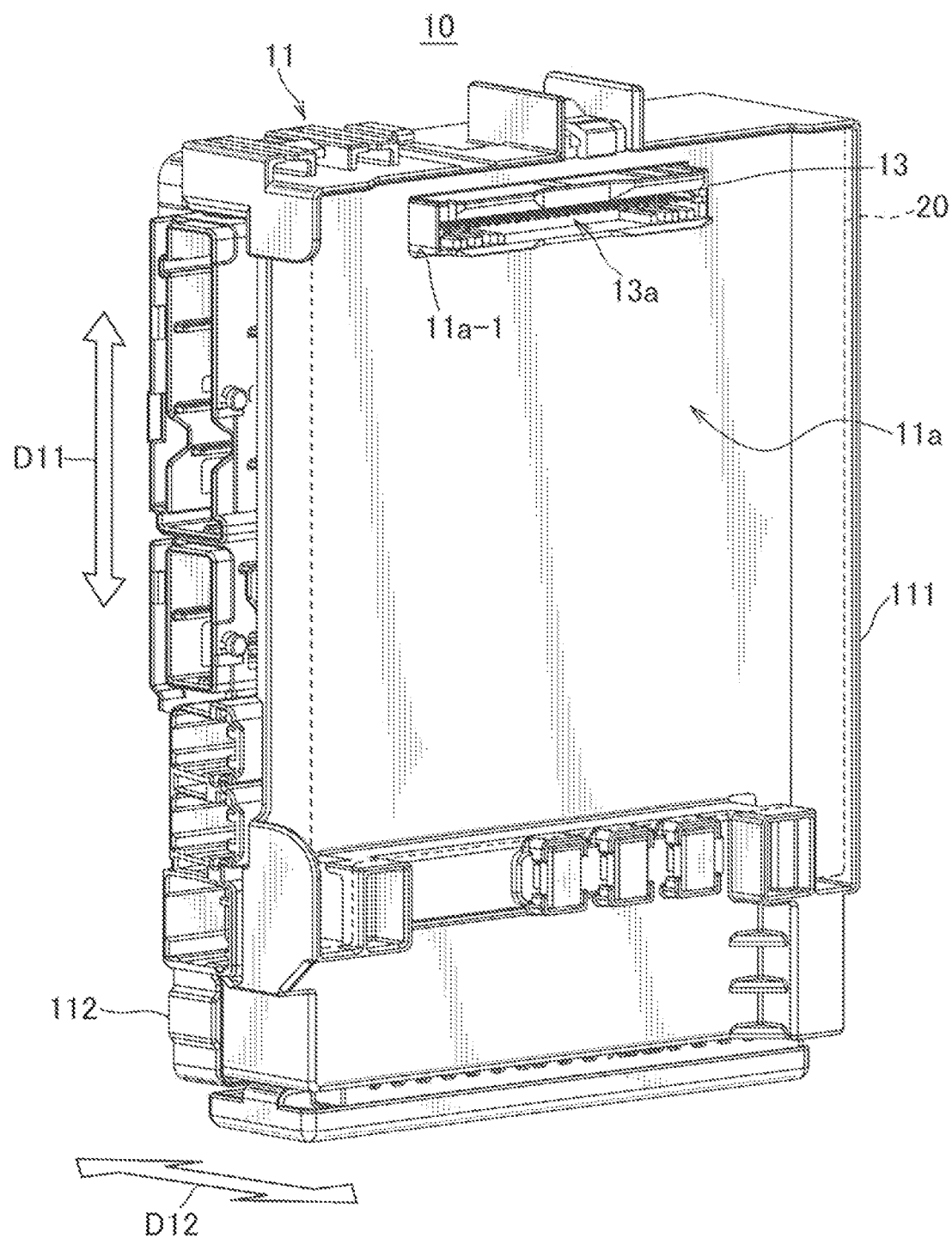
FIG. 1 is a perspective view of an electric connection box to which a drip-proof structure according to an embodiment and a connector with drip-proof structure according to an embodiment are adopted.
Figure 2:
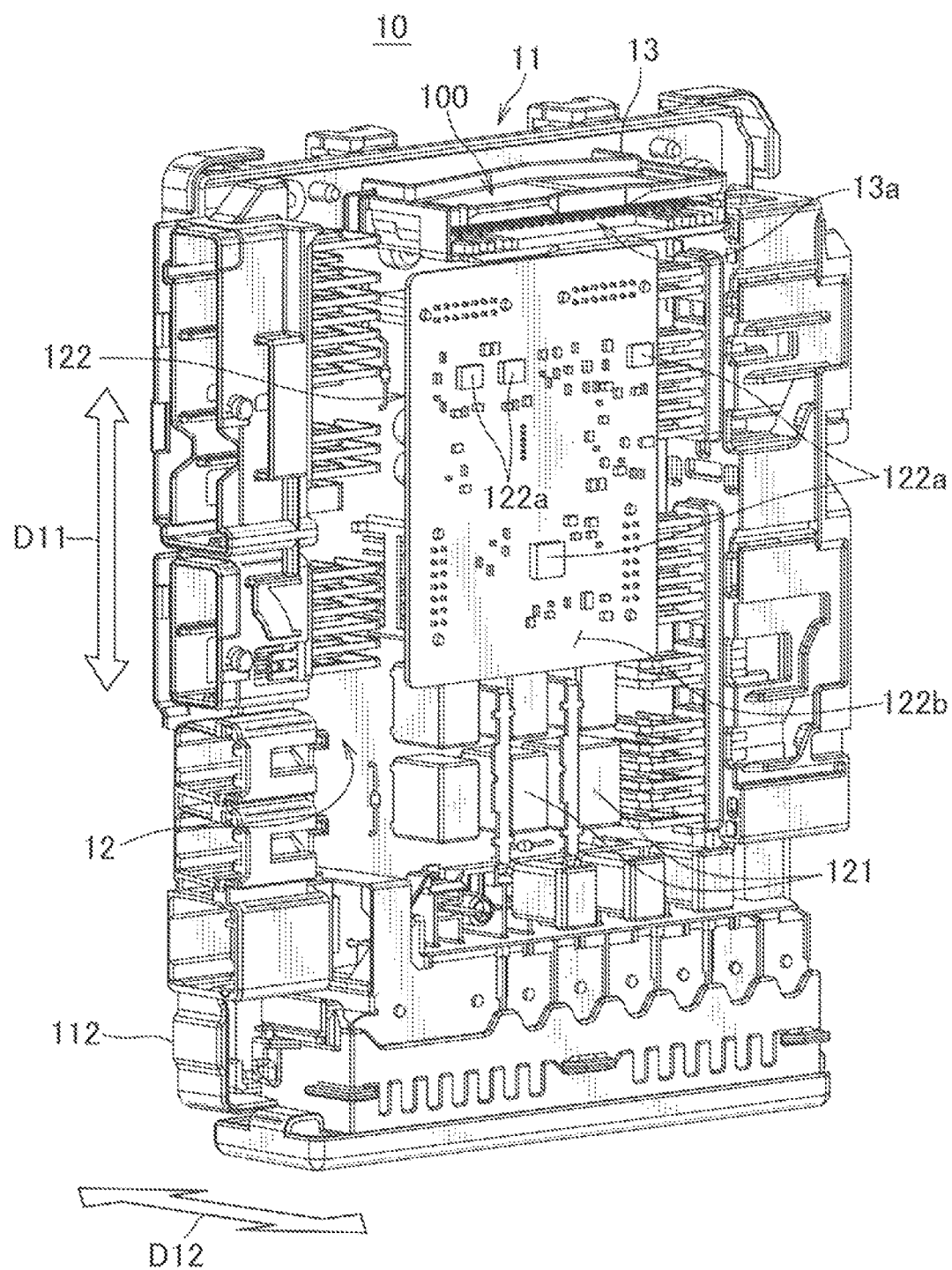
FIG. 2 is a perspective view of the electric connection box in which a part of an outer wall of a housing shown in FIG. 1 is removed to make an inner structure visible.

FIG. 1 is a perspective view of an electric connection box to which a drip-proof structure according to an embodiment and a connector with drip-proof structure according to an embodiment are adopted. FIG. 2 is a perspective view of the electric connection box in which a part of an outer wall of a housing shown in FIG. 1 is removed to make an inner structure visible.

An electric connection box 10 according to this embodiment is configured to be mounted on a vehicle such that a circuit board 12 therein is oriented to extend in a vertical direction D11 as shown in FIG. 2. Further, a separate control unit 20 such as an ECU (Electronic Control Unit) accommodating a control circuit is removably connected to the electric connection box 10. The electric connection box 10 has a flat rectangular box shape and has an accommodating space 11a formed on one of a front face and a back face onto which the control unit 20 is placed and accommodated. A bottom face of this accommodating space 11a is provided with an opening 11a-1 for exposing a tip portion 13a of a connector with drip-proof structure 13 as a connecting part with a mating connector of the control unit 20 for electrically connecting the control unit 20 to the electric connection box 10.

The electric connection box 10 includes a housing 11, a circuit board 12 and the connector with drip-proof structure 13.

The housing 11 has a rectangular box-like shape as an entire shape that is flat with respect to a thickness direction D12 intersecting the circuit board 12 therein. This housing 11 includes a first housing part 111 having a face formed with the accommodating space 11a for the control unit 20, and a second housing part 112 that is combined with the first housing part 111 to define an inner space in which the circuit board 12 and such are accommodated. The opening 11a-1 is provided to the first housing part 111. FIG. 2 illustrates the electric connection box 10 with the first housing part 111 removed.

The circuit board 12 is a panel-like board mounted inside the housing 11 so as to extend in the vertical direction D11 when the electric connection box 10 is mounted on the vehicle, and is mounted with various electric components 121 and a sub-board 122. The sub-board 122 is provided with a component mount area 122b at which various semiconductor components 122a and such having poor resistance to liquid are mounted.

The connector with drip-proof structure 13 is mounted on the circuit board 12 so as to protrude like a canopy from a mount position close to an upper end of the circuit board 12 and such that the tip portion 13a to be connected to the mating connector of the control unit 20 is exposed from the opening 11a-1 of the housing 11. This connector with drip-proof structure 13 blocks liquid from falling onto the component mount area 122b on the sub-board 122 arranged below the mount position of the connector with drip-proof structure 13.

Figure 3:
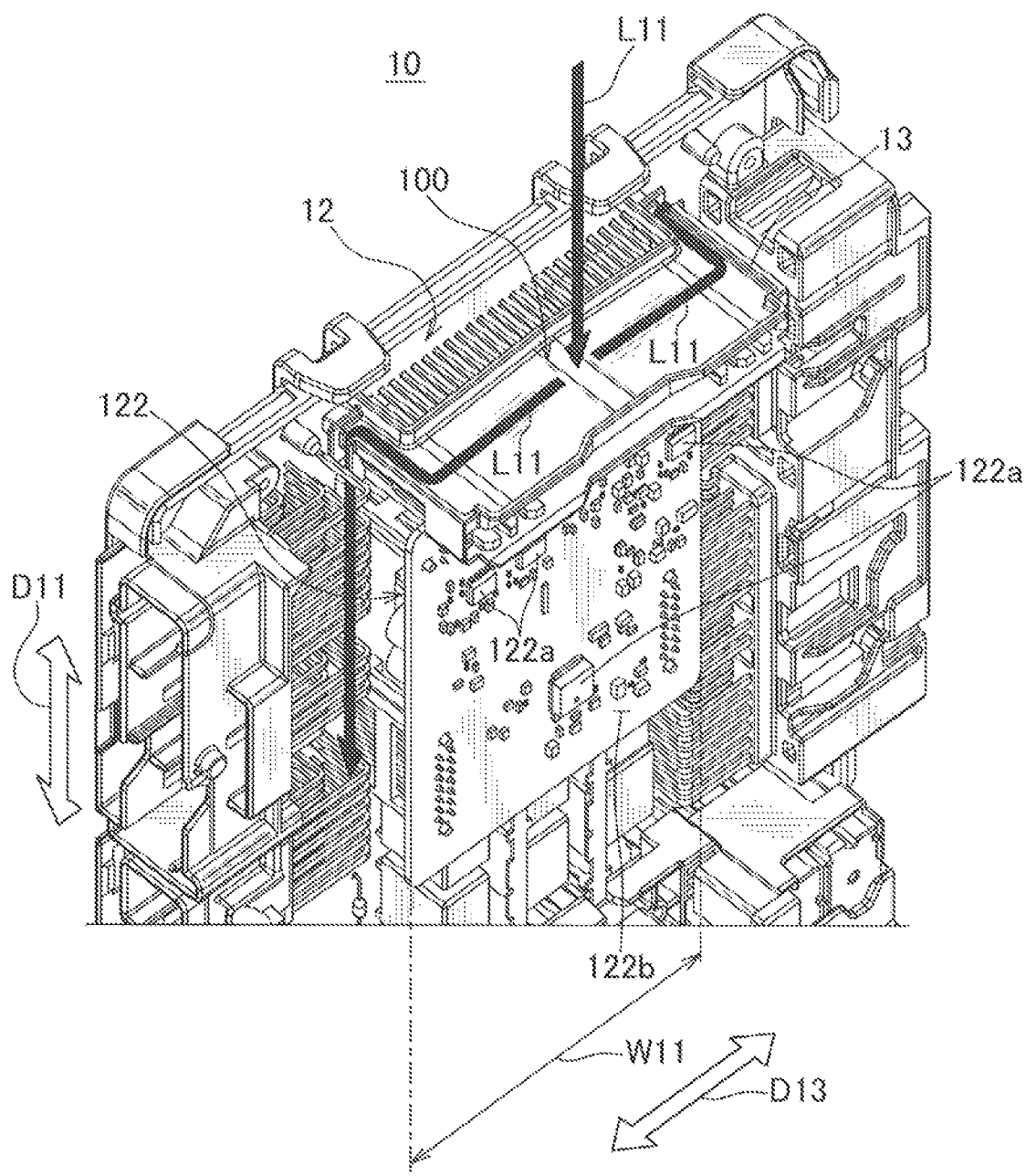
FIG. 3 illustrates how the connector with drip-proof structure shown in FIG. 2 blocks liquid from falling onto a component mount area located below the connector with drip-proof structure.

FIG. 3 illustrates how the connector with drip-proof structure shown in FIG. 2 blocks liquid from falling onto the component mount area located below the connector with drip-proof structure.

The connector with drip-proof structure 13 is mounted at the mount position close to the upper end of the circuit board 12 so as to extend in a traverse direction D13 for a length equal to or greater than a traverse width W11 of the component mount area 122b on the sub board 122, the traverse direction D13 extending along the circuit board 12 and intersecting the vertical direction D11. This connector with drip-proof structure 13 receives, above the component mount area 122b, liquid L11 entering inside the housing 11 from an upper part of the opening 11a-1 of the housing 11 of the electric connection box 10 and/or from any joint or the like located above the connector with drip-proof structure 13, for example. The received liquid L11 flows on the connector with drip-proof structure 13 in the traverse direction D13 and is discharged downward from two discharge spouts positioned out of the component mount area 122b with respect to the traverse direction D13. Thus, the connector with drip-proof structure 13 is a connector that blocks liquid from falling onto the component mount area 122b located below the connector. This connector with drip-proof structure 13 is provided with a drip-proof structure 100 explained below.

Figure 4:
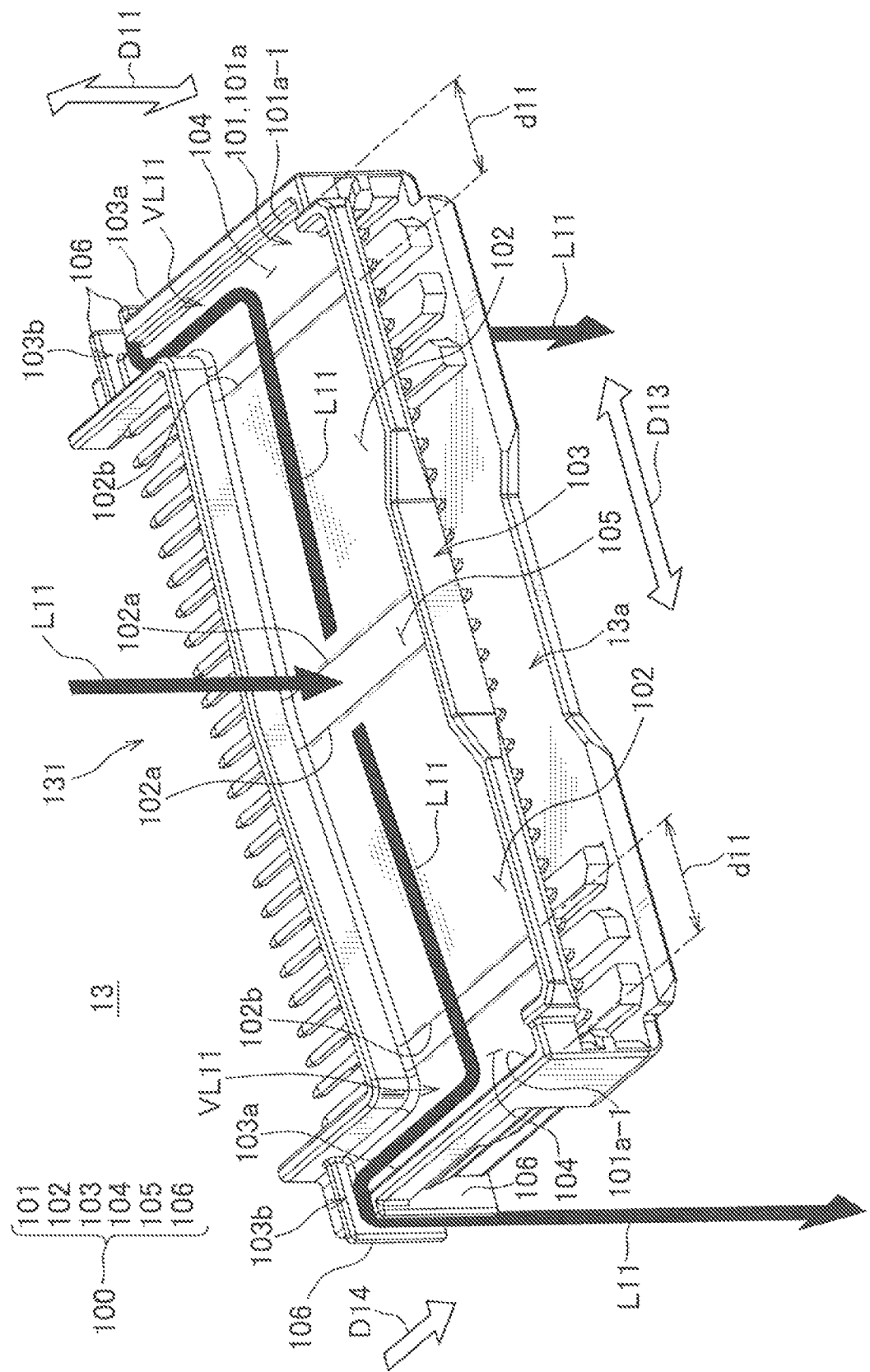
FIG. 4 is a perspective view of the connector with drip-proof structure shown in FIG. 1 through FIG. 3, illustrating flow of the received liquid.

FIG. 4 is a perspective view of the connector with drip-proof structure shown in FIG. 1 through FIG. 3, illustrating flow of the received liquid.

The connector with drip-proof structure 13 includes a connector body 131 and the drip-proof structure 100. The connector body 131 is mounted so as to protrude like a canopy from the mount position close to the upper end of the circuit board 12 and so as to extend in the traverse direction D13 for a length equal to or greater than the traverse width W11 of the component mount area 122b on the sub-board 122 located below the connector body. The drip-proof structure 100 is constituted so as to include an upper wall 101 of the connector body 131 and is configured to block the liquid L11 from falling onto the component mount area 122b.

The drip-proof structure 100 includes the upper wall 101 of the connector body 131, an inclined face 102, a rib wall 103, a terminal side horizontal face 104, a top side horizontal face 105 and a guide wall 106.

The upper wall 101 is an upper wall of a housing of the connector body 131 having a rectangular box-like shape that is flat with respect to the vertical direction D11, and has a substantially rectangular shaped upper face 101a. The connector body 131 is mounted on the circuit board 12 such that a long side of this substantially rectangular shaped upper face 101a extends in the traverse direction D13 described above.

The inclined face 102 is provided on the upper face 101a of the upper wall 101 of the connector body 131 so as to extend from the tip portion 13a side in a protruding direction D14 of the connector body 131 to the circuit board 12 side of the connector body 131. The inclined faces 102 are provided in a pair such that, in the traverse direction D13, the inclined faces 102 are inclined downward from a pair of top positions 102a toward side edges 101a-1 at both ends of the upper face 101a, respectively, the top positions 102a being aligned adjacent to each other at a substantially center of the upper face 101a. Specifically, each inclined face 102 is inclined downward from each top position 102a to each terminal position 102b positioned with a gap d11 from each side edge 101a-1 of the upper face 101a. Each inclined face 102 guides the liquid L11 received by the upper wall 101 to each terminal position 102b.

The rib wall 103 is a standing wall standing from four peripheral edges of the substantially rectangular shaped upper face 101a, and a part of the rib wall 103 that corresponds to the top position 102a of the inclined face 102 has a height equal to or greater than the top position 102a. The pair of discharge spouts 103b for the liquid L11 is formed by cutting out a part of each of a pair of side portions 103a of the rib wall 103 standing from the respective side edges 101a-1 of the upper face 101a.

The terminal side horizontal faces 104 are horizontal faces provided in a pair and are respectively provided on the upper face 101a between the terminal positions 102b of the respective inclined faces 102 and each of the pair of side portions 103a of the rib wall 103. Each terminal side horizontal face 104 is arranged in a band-like shape so as to extend from the tip portion 13a side to the circuit board 12 side of the connector body 131.

The top side horizontal face 105 is a single horizontal face which is provided between the top positions 102a of the respective inclined faces 102 that are aligned adjacent each other at the substantially center of the upper face 101a and which is arranged in a band-like shape so as to extend from the tip portion 13a side to the circuit board 12 side of the connector body 131.

The guide walls 106 are configured to guide, to the lower side, the liquid L11 discharged from the discharge spout 103b provided to each of the pair of side portions 103a of the rib wall 103. The guide walls 106 are provided in a pair for each discharge spout 103b to make the liquid L11 from each discharge spout 103b flow between each other. Each pair of guide walls 106 is provided from a part of the side portion 103a of the rib wall 103 where the discharge spout 103b is provided across each side face of the connector body 131.

As shown in FIG. 4, the liquid L11 received by the upper wall 101 of the connector body 131 is guided by each of the pair of inclined faces 102 and flows in two directions with respective to the traverse direction D13. The liquid L11 flowed to the respective directions is retained temporarily at a pair of reservoir spaces VL11 defined by the rib wall 103 and each of the terminal side horizontal faces 104 positioned at both ends of the upper face 101a of the upper wall 101 in the traverse direction D13. The liquid L11 within the reservoir spaces VL11 is guided by each of the pair of guide walls 106 from each discharge spout 103b and discharged downward. As shown in FIG. 3, the discharge position is a position which is out of the component mount area 122b on the sub-board 122 in the traverse direction D13 and at which a risk of dripping, i.e., a risk of the liquid falling onto the component mount area 122b is small.

According to the drip-proof structure 100, the connector with drip-proof structure 13 and the electric connection box 10 of the embodiment explained above, the liquid L11 entering inside the housing 11 can be received above the component mount area 122b and can be smoothly guided to the discharge position where the risk of dripping is small. That is, in this embodiment, the terminal position 102b of the inclined face 102 on the upper face 101a of the upper wall 101 of the connector body 131 is positioned with the gap d11 from the side edge 101a-1 of the upper face 101a. By positioning the terminal position 102b of the inclined face 102 in this manner, an inclination of the inclined face 102 is made steep as compared with the case where the terminal position of the inclined face corresponds to the side edge 101a-1, for example. By providing the steep inclined face 102, the liquid L11 received by the upper wall 101 can be smoothly guided to the terminal position 102b and thus to the discharge position where the risk of the liquid falling onto the component mount area 122b is small.

In this embodiment, the rib wall 103 is provided in which the part thereof corresponding to the top position 102a of the inclined face 102 has a height equal to or greater than the top position 102a, and the discharge spout 103b for the liquid L11 is formed at the side portion 103a of the rib wall 103. According to this configuration, the rib wall 103 prevents the liquid L11 from falling out in the middle of being guided by the inclined face 102. Then, the discharge spout 103b of the side portion 103a allows to discharge the liquid L11 from the side of the connector body 131 where the side edge is, at which the risk of the liquid being falling onto the component mount area 122b is small. Moreover, since the discharge position of the liquid L11 where the liquid is discharged downward can be limited to the position where the discharge spout 103b is formed on the rib wall 103, it is possible to configure such that the liquid L11 is discharged from the desired discharge position in accordance with for example the arrangement of the semiconductor components 122a on the component mount area 122b.

Further, in this embodiment, the terminal side horizontal face 104 is provided adjacent to the terminal position 102b of the inclined face 102 to which the liquid L11 is guided. According to this configuration, the strength of the flow of the liquid L11 that has been guided by the steep inclined face 102 is weakened by the terminal side horizontal face 104, thereby preventing the liquid L11 from falling out due to the strong flow. Further, the liquid L11 that has been guided is discharged after being retained temporarily at the reservoir space VL11 defined by the rib wall 103 and the terminal side horizontal face 104. Since the bottom face of the reservoir space VL11 is a horizontal face, the reservoir space VL11 can be arranged wide as compared with the case where, for example, a reservoir space having an inclined bottom face formed by extending the inclined face to the side edge, thereby allowing to retain more liquid L11 as compared with the latter case. That is, according to the configuration described above, the upper wall 101 of the connector body 131 can have improved tolerance for the dripping amount of the liquid L11.

Furthermore, in this embodiment, the top side horizontal face 105 is provided adjacent to the top positions 102a. According to this configuration, the liquid L11 received at the top positions 102a is dispersed by the top side horizontal face 105 throughout an area from the tip portion 13a side to the circuit board 12 side and flows down the inclined face 102 widely throughout this area. That is, according to the above-described configuration, it is possible to make the liquid L11 flow efficiently using the wide area of the inclined face 102.

Furthermore, in this embodiment, the pair of guide walls 106 is provided from a part where the discharge spout 103b is provided across the side face of the connector body 131. According to this configuration, the pair of guide walls 106 can reduce the dispersion of the liquid L11 discharged from the discharge spout 103b, thereby allowing to configure the preferable discharge path that extends, to the lower side, from the desired discharge position determined by the position of the discharge spout 103b.

Furthermore, in this embodiment, the inclined faces 102 are provided in a pair so as to be inclined, with respect to the traverse direction D13, downward from the pair of top positions 102a to the terminal positions 102b, respectively. According to this configuration, each of the pair of inclined faces 102 can be arranged steep and the liquid L11 can be guided more smoothly as compared with the case where, for example, there is only a single inclined face that is inclined from the top position close to the one end of the upper face 101a to the terminal position on the other end side of the upper face 101a. In addition, since the liquid L11 is dispersed into two directions while being guided, the upper wall 101 of the connector body 131 can have improved tolerance for the dripping amount of the liquid L11.

The embodiment described above is illustrative only to show a representative embodiment of the drip-proof structure, the connector with drip-proof structure and the electric connection box, and thus the drip-proof structure, the connector with drip-proof structure and the electric connection box are not limited to the embodiment described above and can be modified in various ways.

For example, the embodiment described above exemplary shows the flat and rectangular box-like shaped electric connection box 10 which is mounted on a vehicle and to which the separate control unit 20 such as an ECU is removably connected, and exemplary shows the drip-proof structure 100 and the connector with drip-proof structure 13 configured to be adopted to this electric connection box 10. However, the drip-proof structure, the connector with drip-proof structure and the electric connection box are not limited to these. The mounting manner, the electric connection manner, and the appearance shape and such of the electric connection box do not manner and may be set arbitrary in accordance with the use thereof. Also, with respect to the connector with drip-proof structure and the drip-proof structure, an object to be adopted does not matter and may be set arbitrary.

Furthermore, in the embodiment described above, the circuit board 12 built into the electric connection box 10 is shown as one example of the vertically-extending panel-like object as an object on which the connector is mounted. However, the panel-like object is not limited to this, and the specific use thereof does not matter as long as it is a vertically-extending panel-like object.

Furthermore, the embodiment described above shows, as one example of the drip-proof structure, the drip-proof structure 100 provided with the rib wall 103, a part thereof corresponding to the top position 102a of the inclined face 102 having a height equal to or greater than the top position 102a, and the discharge spout 103b for the liquid L11 being provided to the side portion 103a of the rib wall 103. However, the drip-proof structure is not limited to this and may not be provided with the rib wall 103 with the discharge spout 103b. However, by providing the rib wall 103 as described above, the liquid L11 can be prevented from falling out in the middle of being guided by the inclined face 102, thus it is possible to configure such that the liquid L11 is discharged from the desired discharge position, as described above.

Furthermore, the embodiment described above shows, as one example of the drip-proof structure, the drip-proof structure 100 that is provided with the terminal side horizontal face 104 arranged adjacent to the terminal position 102b of the inclined face 102. However, the drip-proof structure is not limited to this, and the terminal side horizontal face 104 may be omitted and the inclined face may be extended to the side edge of the upper face of the connector, for example. However, by providing the terminal side horizontal face 104, the tolerance for the dripping amount of the liquid L11 can be improved, as described above.

Furthermore, the embodiment described above shows, as one example of the drip-proof structure, the drip-proof structure 100 that is provided with the top side horizontal face 105 arranged adjacent to the top position 102a of the inclined face 102. However, the drip-proof structure is not limited to this and may not be provided with the top side horizontal face 105. In this case, when the pair of inclined faces is to be provided as the above-described embodiment, the inclined faces may extend in two directions from a single and common top position. However, by providing the top side horizontal face 105, it is possible to make the liquid L11 to flow efficiently using the wide area of the inclined face 102, as described above.

Furthermore, the embodiment described above shows, as one example of the drip-proof structure, the drip-proof structure 100 that is provided with the pair of guide walls 106 for guiding the liquid L11 from the discharge spout 103b. However, the drip-proof structure is not limited to this, and the guide walls 106 may be omitted and the liquid L11 may be discharged from the discharge spout 103b in a free manner. However, by providing the guide walls 106, it is possible to configure the preferable discharge path that extends from the discharge spout 103b to the lower side, as described above.

Furthermore, the embodiment described above shows, as one example of the drip-proof structure, the drip-proof structure 100 that is provided with the pair of inclined faces 102. However, the drip-proof structure is not limited to this and may be provided with only a single inclined face. However, by providing the pair of inclined faces 102, the liquid L11 can be guided more smoothly, and the tolerance for the dripping amount of the liquid L11 can be improved, as described above.

LIST OF REFERENCE SIGNS 10 electric connection box
20 control unit
11 housing
11a accommodating space
11a-1 opening
12 circuit board
13 connector with drip-proof structure
13a tip portion
100 drip-proof structure
101 upper wall
101a upper face
101a-1 side edge
102 inclined face
102a top position
102b terminal position
103 rib wall
103a side portion
103b discharge spout
104 terminal side horizontal face
105 top side horizontal face
106 guide wall
111 first housing part
112 second housing part
121 electric component
122 sub-board
122a semiconductor component
122b component mount area
131 connector body
d11 gap
L11 liquid
D11 vertical direction
D12 thickness direction
D13 traverse direction
D14 protruding direction
W11 traverse width
VL11 reservoir space

What is claimed is:
1. A drip-proof structure comprising:
an upper wall of a connector, the upper wall being mounted, at a mount position close to an upper end of a panel-like object, so as to protrude in a canopy-like fashion from the mount position, the upper wall extending in a vertical direction and in a traverse direction intersecting the vertical direction, along the panel-like object, for a length equal to or greater than a traverse width of a component mount area located below the mount position, on the panel-like object, the upper wall being configured to block liquid from falling onto the component mount area, the traverse direction being arranged along a long side of a substantially rectangular shaped upper face of the upper wall of the connector; and an inclined face provided on an upper face of the upper wall so as to extend from a tip portion side of the connector, in a protruding direction to a side of the connector corresponding to the panel-like object, wherein, the inclined face is inclined downward, with respect to the traverse direction, from an arbitral top position of the inclined face, toward at least one of side edges at both ends, in the traverse direction, of the upper face of the upper wall, to a terminal position on the upper face of the upper wall which is positioned with a gap from the at least one of the side edges, and the inclined face is configured to guide the liquid received by the upper wall to the terminal position.

2. The drip-proof structure as claimed in claim 1, further comprising:
a rib wall standing up from a peripheral edge of the upper face of the upper wall, such that at least a part of the rib wall, which corresponds to the arbitral top position of the inclined face, has a height equal to or greater than a height of the arbitral top position of the inclined face, wherein
a part of a side portion of the rib wall which stands up from the at least one of the side edges of the upper face is cut out to form a discharge spout for the liquid.

3. The drip-proof structure as claimed in claim 2, further comprising:
a terminal side horizontal face extending between the terminal position on the upper face of the inclined face and the side portion of the rib wall, and which extends from the tip portion side of the connector to the side of the connector corresponding to the panel-like object.

4. The drip-proof structure as claimed in claim 1, further comprising:
a top side horizontal face provided adjacent to the arbitral top position of the inclined face, on the upper face, and extending from the tip portion side of the connector to the side of the connector corresponding to the panel-like object.

5. The drip-proof structure as claimed in claim 2, further comprising:
a pair of guide walls configured to allow the liquid to flow between each other to thereby guide the liquid discharged from the discharge spout, wherein
the pair of guide walls is provided from a part of the side portion of the rib wall, where the discharge spout is provided, across a side face of the connector corresponding to the at least one of the side edges.

6. The drip-proof structure as claimed in claim 1, further comprising:
another inclined face, such that the inclined face and the another inclined face are provided as a pair, wherein
the pair of inclined faces are provided such that the inclined faces are inclined downward, when viewed from the traverse direction, from either the arbitral top position of the inclined face, or from a pair of top positions aligned adjacent to each other toward respective side edges at the both ends of the upper face to respective terminal positions, respectively, and
each of terminal positions of the pair of inclined faces are positioned with a gap from each of respective side edges of the upper face.

7. A connector comprising:
the drip-proof structure of claim 1, and
a connector body.

8. An electric connection box; comprising:
the drip-proof structure of claim 1,
a housing;
the panel-like object, the panel-like object being mounted inside the housing so as to extend in a vertical direction; and
a connector body.

* * * * *